US006622981B1

United States Patent
Hsieh (10) Patent No.: US 6,622,981 B1
(45) Date of Patent: Sep. 23, 2003

(54) FOLDING ARM FOR A MUSICAL INSTRUMENT STAND

(76) Inventor: Wu-Hong Hsieh, No. 162, Chung Shan 2nd Rd., Lu Chou City, Taipei Hsien (TW)

( * ) Notice: Subject to any disclaimer, the term of this patent is extended or adjusted under 35 U.S.C. 154(b) by 0 days.

(21) Appl. No.: 10/096,548

(22) Filed: Mar. 12, 2002

(51) Int. Cl.[7] .................................................. F04G 3/00
(52) U.S. Cl. ...................................... 248/291.1; 84/327
(58) Field of Search ............................. 248/291.1, 121, 248/158, 170, 166, 232.41, 224.7; 403/187, 188, 102, 101, 120, 119; 84/327, 421

(56) References Cited

U.S. PATENT DOCUMENTS

| 1,045,583 | A | * | 11/1912 | Mills | 211/85.6 |
|---|---|---|---|---|---|
| 4,215,838 | A | * | 8/1980 | Gullota | 248/121 |
| 5,454,473 | A | * | 10/1995 | Hennessey | 211/85.6 |
| 5,726,369 | A | * | 3/1998 | Gilday | 84/327 |
| 5,852,250 | A | * | 12/1998 | Cha | 84/327 |
| 5,959,225 | A | * | 9/1999 | Hsu | 84/327 |
| 6,127,612 | A | * | 10/2000 | Yu | 84/327 |
| 6,209,829 | B1 | * | 4/2001 | Yu | 248/122.1 |
| 6,323,405 | B1 | * | 11/2001 | Yu | 84/327 |
| 6,439,532 | B1 | * | 8/2002 | Yu | 248/443 |
| 6,513,768 | B1 | * | 2/2003 | Hsieh | 248/121 |
| 2002/0070319 | A1 | * | 6/2002 | Yu | 248/122.1 |
| 2002/0124711 | A1 | * | 9/2002 | Wilfer | 84/327 |

* cited by examiner

Primary Examiner—Leslie A. Braun
Assistant Examiner—Kofiselw Herbrandt
(74) Attorney, Agent, or Firm—Dellett and Walters (57) ABSTRACT

A folding arm mounted on a column of a musical instrument stand has a seat mounted on the column. The seat has a ring. A tube is perpendicular to the column and extending outwards from the ring. A passage is longitudinally defined in the tube. A slot is longitudinally defined through a front end of the tube. An elbow has a rear part pivotally mounted in the slot by a pivot pin. Two movable pieces are received in the passage and pushed by the rear part to tightly abut the column when the elbow is perpendicular to the column. A bar is mounted on a front part of the elbow. Whereby, when the elbow is perpendicular to the column, the arm is secured on the column. When the elbow is pivoted to a position parallel to the column, the arm is movable for adjusting the support height of the stand.

4 Claims, 8 Drawing Sheets

FOLDING ARM FOR A MUSICAL INSTRUMENT STAND

BACKGROUND OF THE INVENTION

1. Field of the Invention

The present invention is related to a musical instrument stand, and more particularly to an arm for the musical instrument stand that can be folded.

2. Description of Related Art

Figure 7:
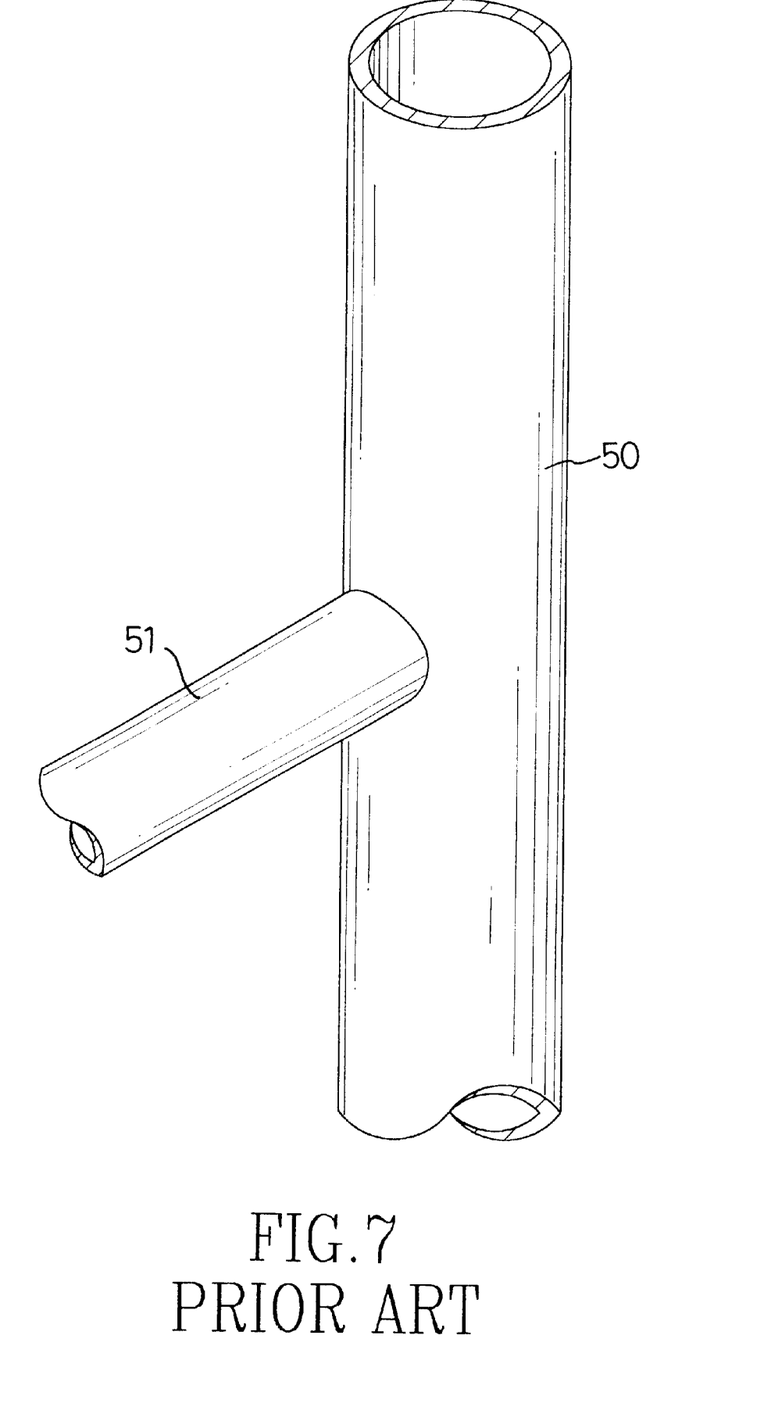
FIG. 7 is a perspective view of a first conventional arm for a musical instrument stand.

Referring to FIG. 7, a conventional musical instrument stand has a fixed arm (51) secured on a vertical column (50). The fixed arm (51) can not be adjusted according to desire of a user and so is not convenient.

Figure 8:
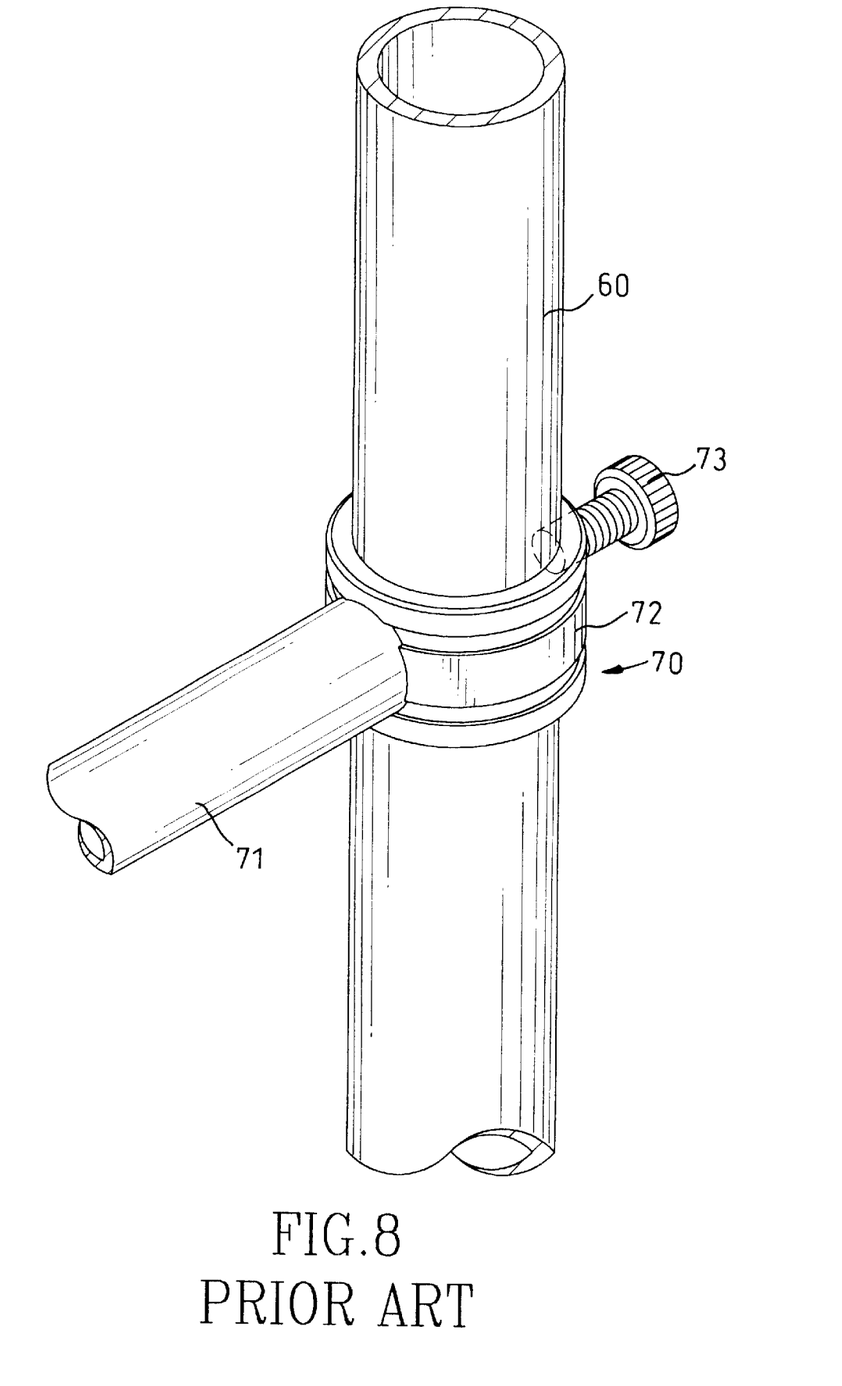
FIG. 8 is a perspective view of a second conventional arm for a musical instrument stand.

Referring to FIG. 8, another conventional musical instrument stand has an adjustable arm (70) movably mounted on a vertical column (60). The adjustable arm (70) has a ring (72) provided on the column (60). A tube (71) extends from the ring (72). A screw (73) is threadingly mounted on the ring (72). When the screw (73) is tightened, the ring (72) is secured on the column (60). When the screw (73) is loosened, the ring (72) is movable along the column (60) for adjusting the height of the arm.

However, it is very inconvenient for a user to adjust the arm by loosening and tightening the screw (73), and it is found that the thread of the screw (73) wears such that clamping effect is unreliable.

Therefore, the invention provides an improved arm for an instrument stand to mitigate and/or obviate the aforementioned problems.

SUMMARY OF THE INVENTION

The main objective of the invention is to provide a folding arm for a musical instrument stand that is convenient to adjust by folding the arm.

Another objective of the invention is to provide a folding arm for a musical instrument stand that has a small size which is convenient for storing or transporting the stand.

Other objects, advantages and novel features of the invention will become more apparent from the following detailed description when taken in conjunction with the accompanying drawings.

DETAILED DESCRIPTION OF THE PREFERRED EMBODIMENT

Figure 1:
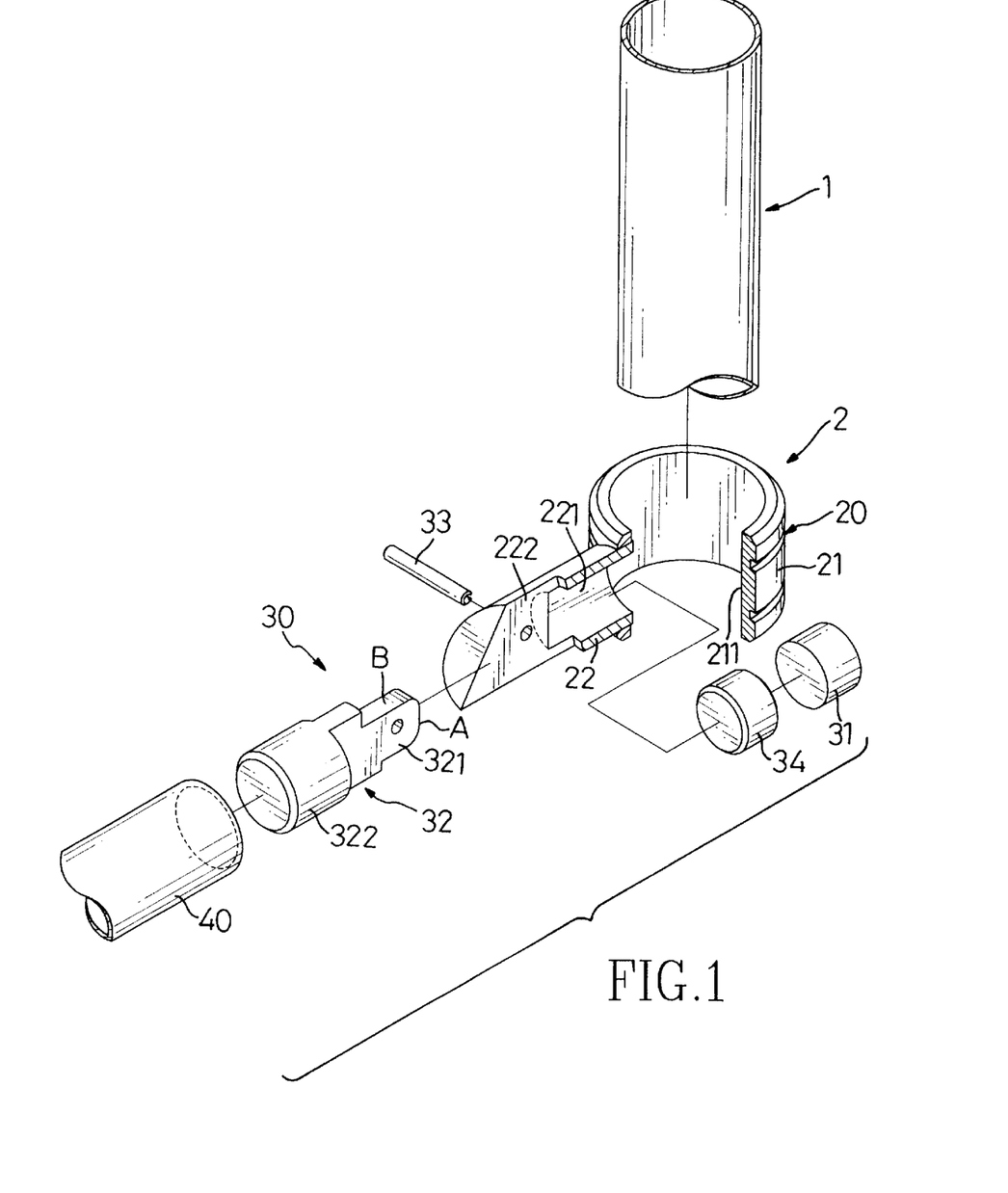
FIG. 1 is an exploded perspective view of an arm for a musical instrument stand in accordance with the invention.
Figure 2:
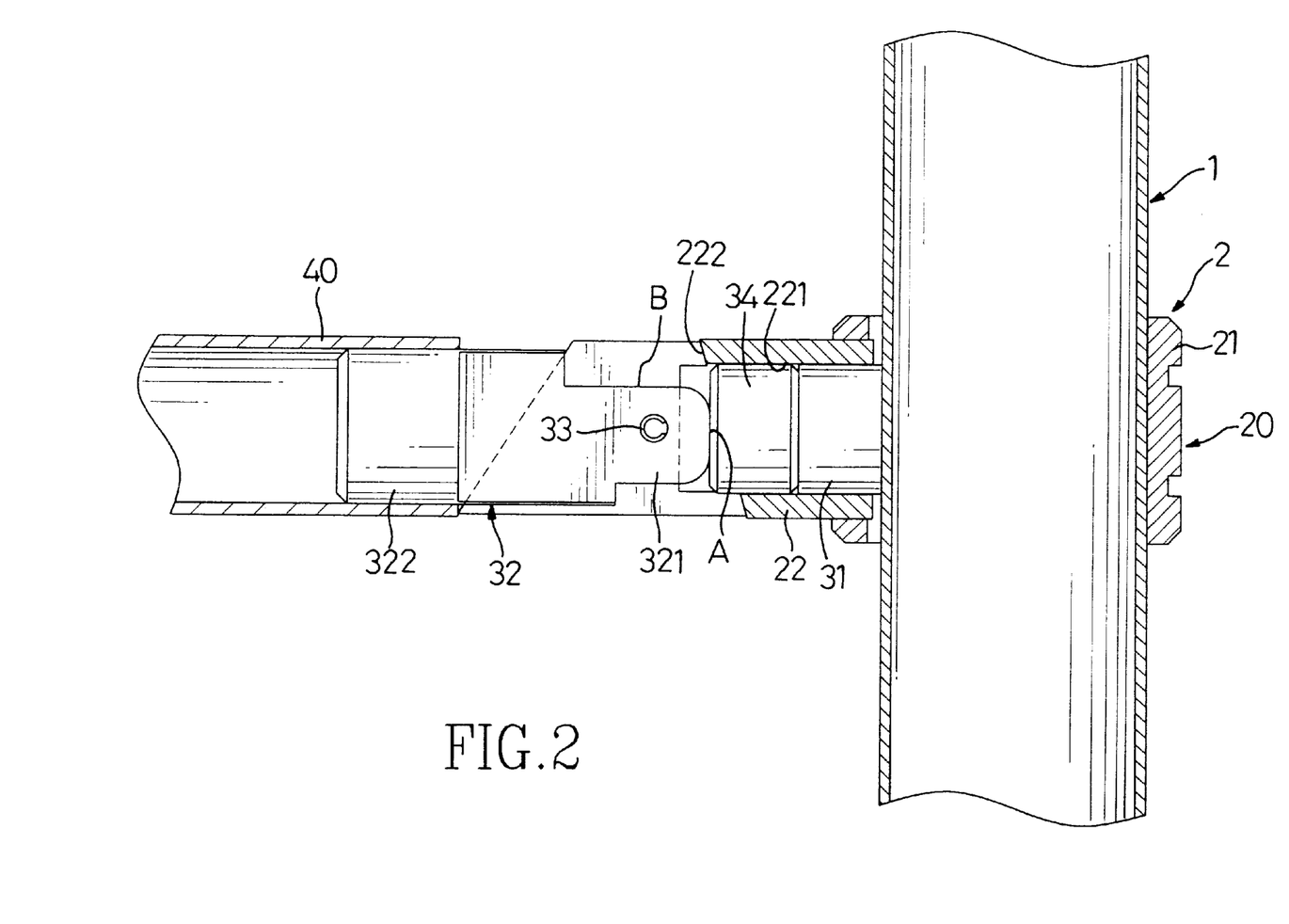
FIG. 2 is a cross sectional view of the arm.

Referring to FIGS. 1 and 2, an arm (2) in accordance with the invention is mounted on a vertical column (1) of a musical instrument stand. The arm (2) is composed of a seat (20), an elbow (30), and a bar (40).

The seat (20) has a ring (21) in which the vertical column (1) is inserted. The ring (21) has an opening (211) defined therein. A tube (22) is perpendicularly formed on the ring (21). A passage (221) is longitudinally defined at a rear portion of the tube (22) and in communication with an interior of the ring (21). A slot (222) is longitudinally defined at a front portion of the tube (22) and in communication with the passage (221).

The elbow (30) has a pivoting member (32) pivotally mounted in the slot (222) by a pin (33) mounted through the front portion of the tube (22). A rear part (321) of the pivoting member (32) is received in the slot (222) and has an aperture (not numbered) in which the pin (33) is inserted. A distance between the pin (33) (the aperture) and an end surface (A) of the rear part (321) is larger than a distance between the pin (33) (the aperture) and a top surface (B) of the rear part (321). When the elbow (30) is not folded, the rear part (321) extends in the passage (221).

The elbow (30) further has a first movable piece (31) and a second movable piece (34) both received in the passage (221). The movable pieces (31, 34) are pushed by the rear part (321), so that the first piece (31) extends in the opening (211) to tightly abut the column (1). Thus, the seat (20) is fastened on the column (1) by using the friction between the column (1) and the ring (21) and between the column (1) and the first movable piece (31).

The bar (40) is provided on a front part (322) of the elbow (30) for supporting a musical instrument.

Figure 3:
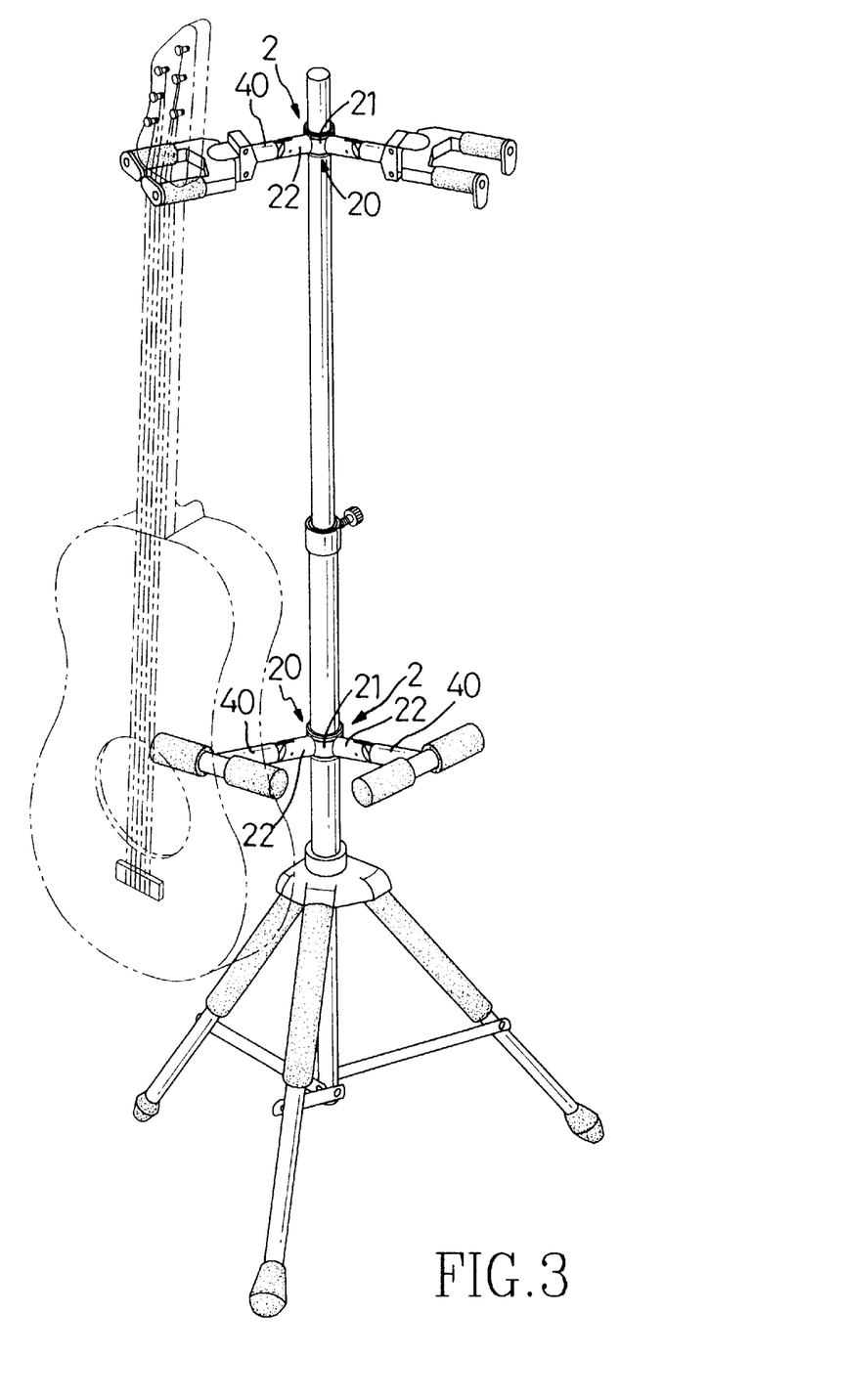
FIG. 3 is a perspective view of the musical instrument stand mounted with the arms of the invention.

FIG. 3 illustrates a guitar stand that has a plurality of the arms (2) of the invention provided thereon and a guitar supported by the arms (2).

Figure 4:
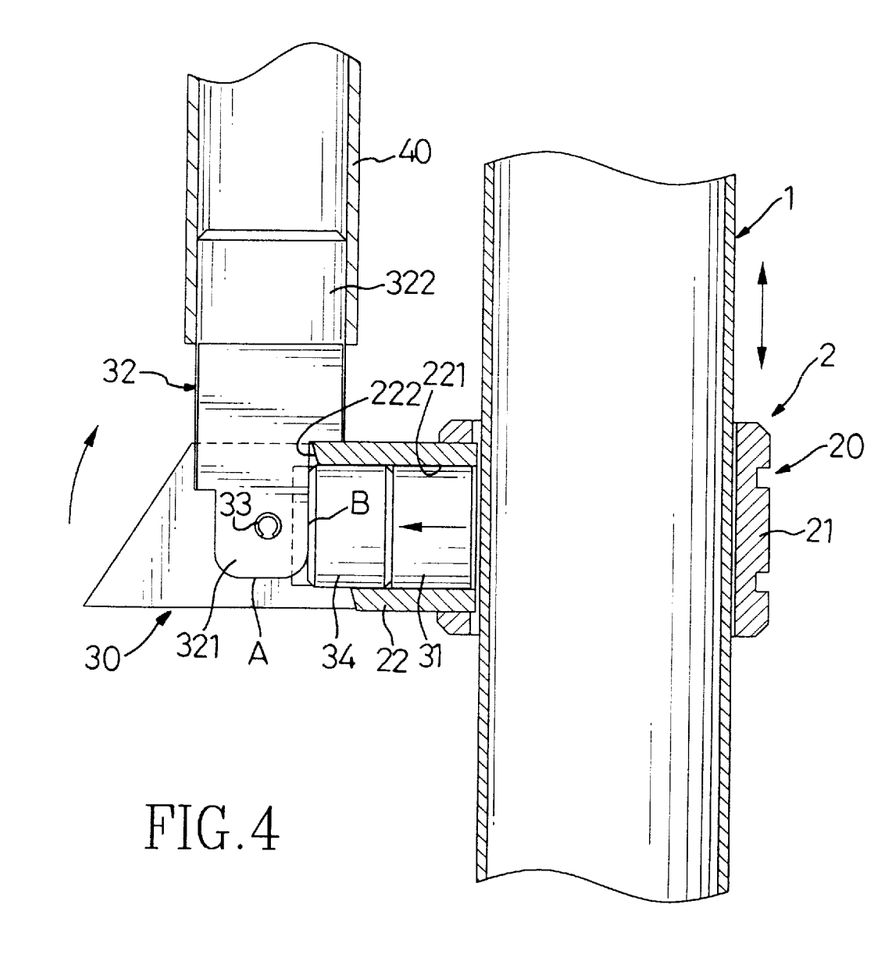
FIG. 4 is a side sectional view showing that the arm is folded.

Referring to FIG. 4, when the arm (2) needs to be adjusted higher or lower, the bar (40) as well as the elbow (30) is pivoted upwards 90°. The end surface (A) is retracted from the passage (221) and the movable pieces (31, 34) are not pushed by the elbow (30). The first movable piece (31) no longer abuts the column (1), so that the arm (2) can be moved upwards or downwards along the column (1) for adjusting the height of the arm. When the arm (2) arrives the desired position, the bar (40) as well as the elbow (30) is pivoted downwards 90°. The end surface (A) extends in the passage (221) again, and the movable pieces (31, 34) are pushed by the elbow (30). Thus, the seat (20) is fastened on the column (1) at the desired position.

Figure 5:
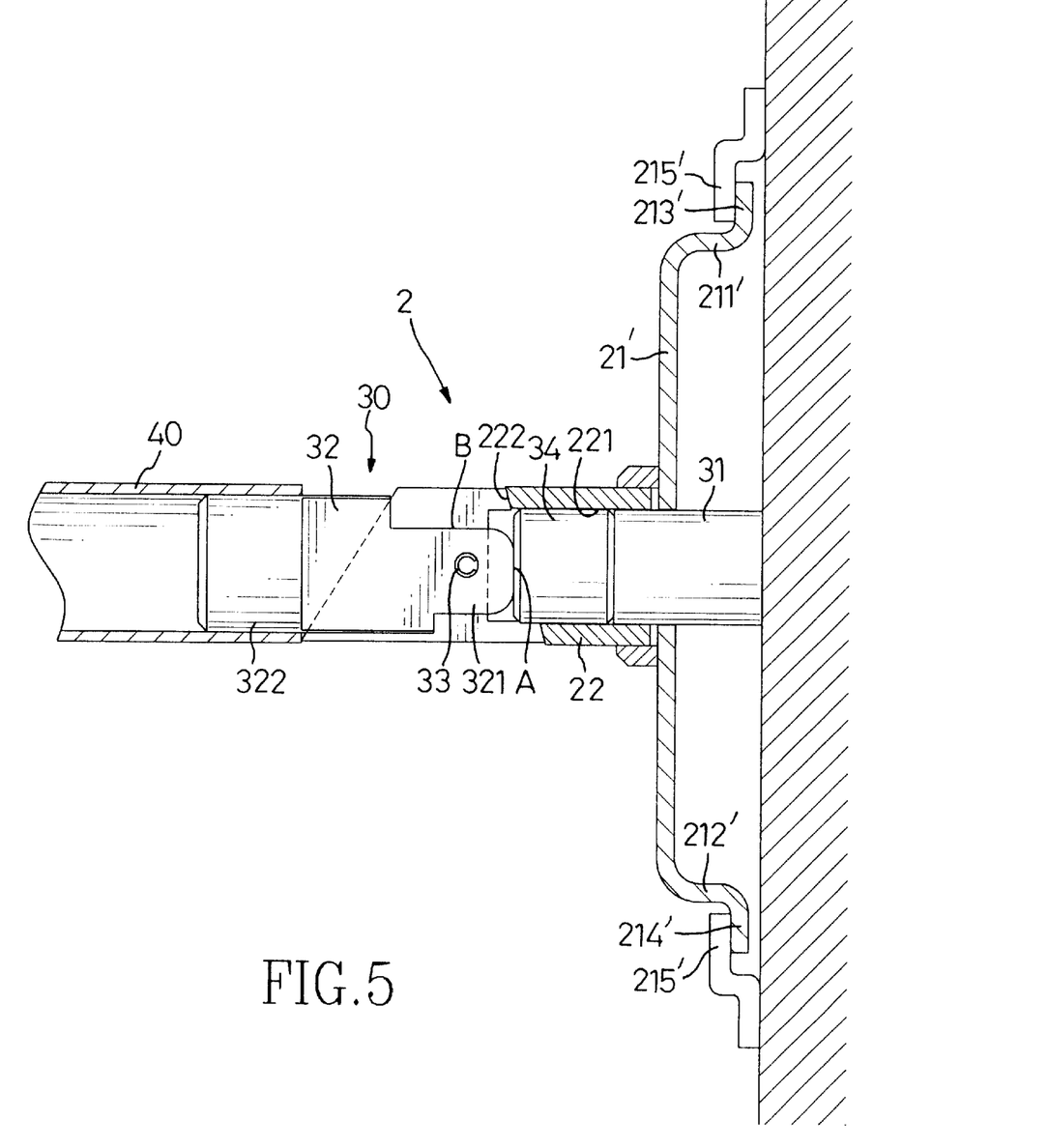
FIG. 5 is a side sectional view of another embodiment of the arm in accordance with the invention.
Figure 6:
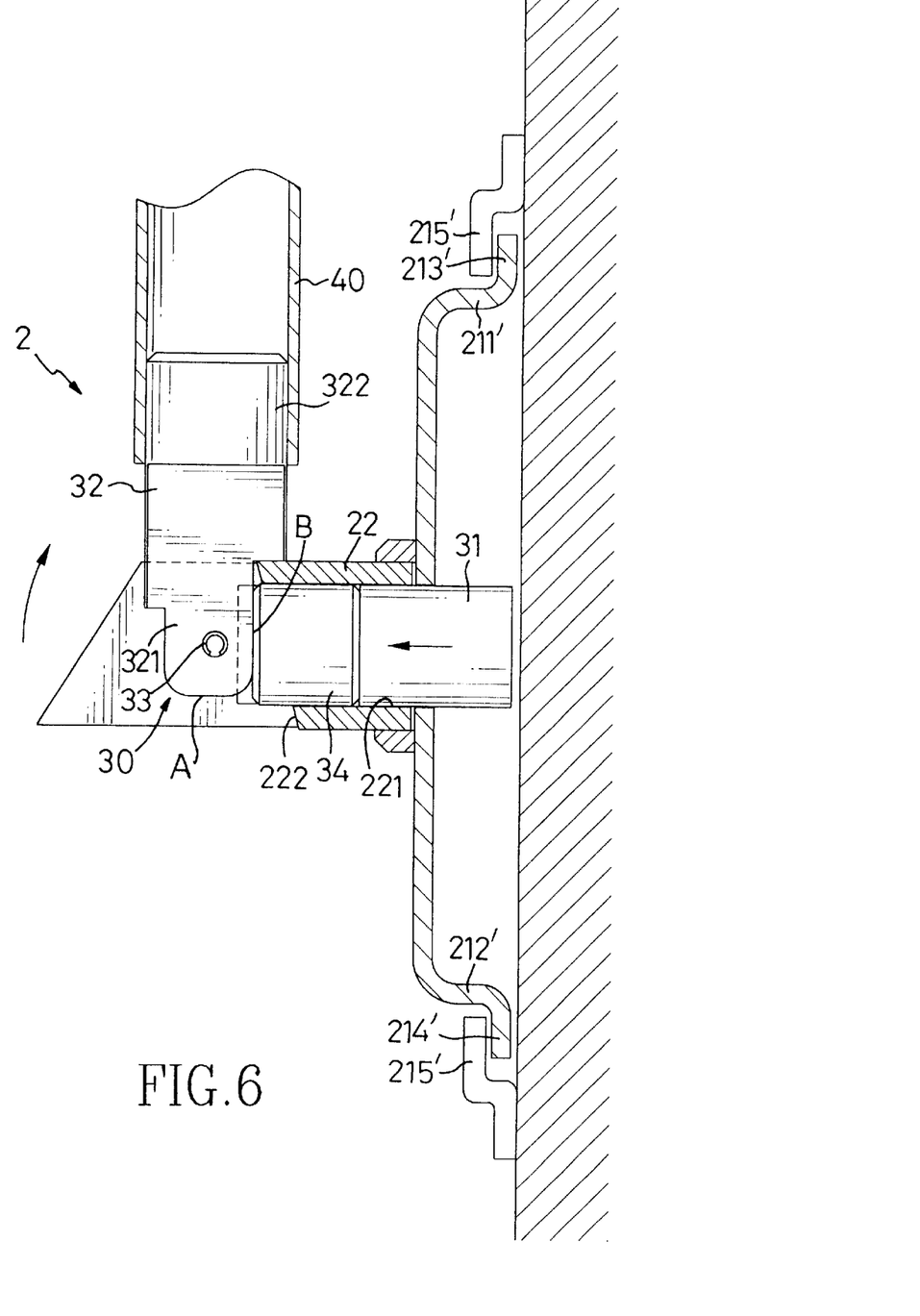
FIG. 6 is a side sectional view showing that the arm in FIG. 5 is folded.

Referring to FIGS. 5 and 6, in a second embodiment of the invention, the seat (20) has a plate (21') with a C-shaped cross section and being composed of a first wing (211') extending upwards and a second wing (212') extending downwards. A first finger (213') and a second finger (214') are respectively formed at distal ends of the wings (211', 212'). Other structures of the embodiment are similar to the first embodiment mentioned above. When the movable pieces (31, 34) are pushed by the elbow (30) to tightly abut the column (1), the fingers (213', 214') are respectively fastened in two ears (215') formed on the column (1) by using friction between the fingers (213', 214') and the ears (215'). Thus, a musical instrument can be supported by the arm (2).

When the bar (40) as well as the elbow (30) is folded, the fingers (213', 214') are disengaged from the ears (215'). Thus, the arm (2) is detached from the column (1) and can be secured by other ears at a desired position on the column (1) or be stored. The ears provide a very secure engagement which is particularly suitable for heavy musical instruments.

From the above description, it is noted that the invention has the following advantages:

1. It is very easy and convenient for a user to adjust the arm (2) by folding the elbow (30).

2. When the arm (2) is folded, the size of the instrument stand is small, which is advantageous to store and transport the stand.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A folding arm (2) mounted on a column (1) of a musical instrument stand, the arm comprising:

a seat (20) mounted on the column (1), the seat (20) having a body (21) and a tube (22) perpendicular to the column (1) and extending outwards from the body (21), the tube (22) having a passage (221) longitudinally defined through a rear end of the tube (22), a slot (222) longitudinally defined through a front end of the tube (22) and in communication with the passage (221);

an elbow (30) having a front part (322), a rear part (321) pivotally mounted in the slot (222) by a pivot pin (33) mounted in the front end of the tube (22), at least one movable piece (31) received in the passage (221) and pushed by the rear part (321) to tightly abut the column (1) when the elbow (30) is perpendicular to the column (1); and a bar (40) mounted on the front part (322) of the elbow (30), whereby, when the elbow (30) is perpendicular to the column (1), the arm (2) is secured on the column (1); when the elbow (30) is pivoted to a position parallel to the column (1), the at least one movable piece (31) is not pushed by the rear part (321) and the arm (2) is movable for adjusting a support height of the musical instrument stand.

2. The folding arm as claimed in claim 1, wherein the body (21) of the seat (20) is a ring (21) with an opening (211), and the passage (221) is in communication with the opening (221).

3. The folding arm as claimed in claim 1, wherein the body (21) of the seat (20) is a plate (21') being composed of a first wing (211') extending upwards and a second wing (212') extending downwards, the plate (21') has a first finger (213') and a second finger (214') respectively formed at distal ends of the wings (211', 212') and respectively attached to two ears (215') formed on the column (1).

4. The folding arm as claimed in claim 1, wherein a distance between an end surface (A) of the rear part (321) and the pivot pin (33) is larger than a distance between a top surface (B) of the rear part (321).

* * * * *